July 2, 1968     J. H. VOGELMAN     3,391,404

PASSIVE DATA TRANSMISSION TECHNIQUE UTILIZING RADAR ECHOES

Filed May 18, 1959     2 Sheets-Sheet 1

INVENTOR.
JOSEPH H. VOGELMAN
BY
ATTORNEY
AGENT

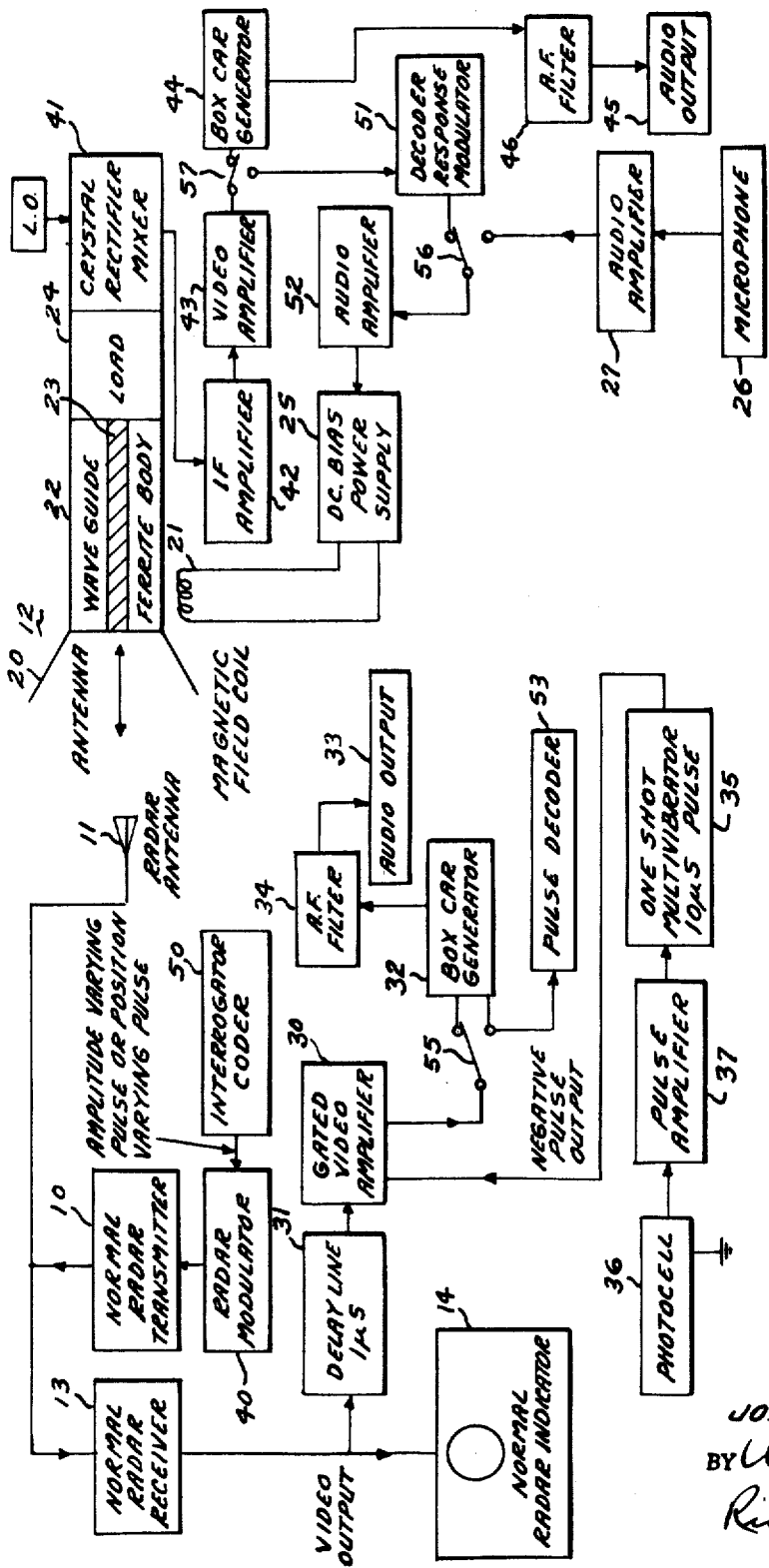

United States Patent Office 3,391,404
Patented July 2, 1968

3,391,404
PASSIVE DATA TRANSMISSION TECHNIQUE
UTILIZING RADAR ECHOES
Joseph H. Vogelman, Rome, N.Y., assignor to the United States of America as represented by the Secretary of the Air Force
Filed May 18, 1959, Ser. No. 814,118
4 Claims. (Cl. 343—6)

The invention described herein may be manufactured and used by or for the United States Government for governmental purposes without payment to me of any royalty thereon.

This invention relates to a system for providing passive modulation of a radar return signal for the transmission of pulse coded data or voice information.

One object of the invention is to provide a system for the transmission of information to a radar receiver from targets which are maintaining radio silence.

This and other objects will be more fully understood from the following detailed description taken with the drawing wherein:

FIG. 2 shows a further embodiment of the invention, which provides for a 2-way transmission of pulse coded data or voice information.

Figure 1:
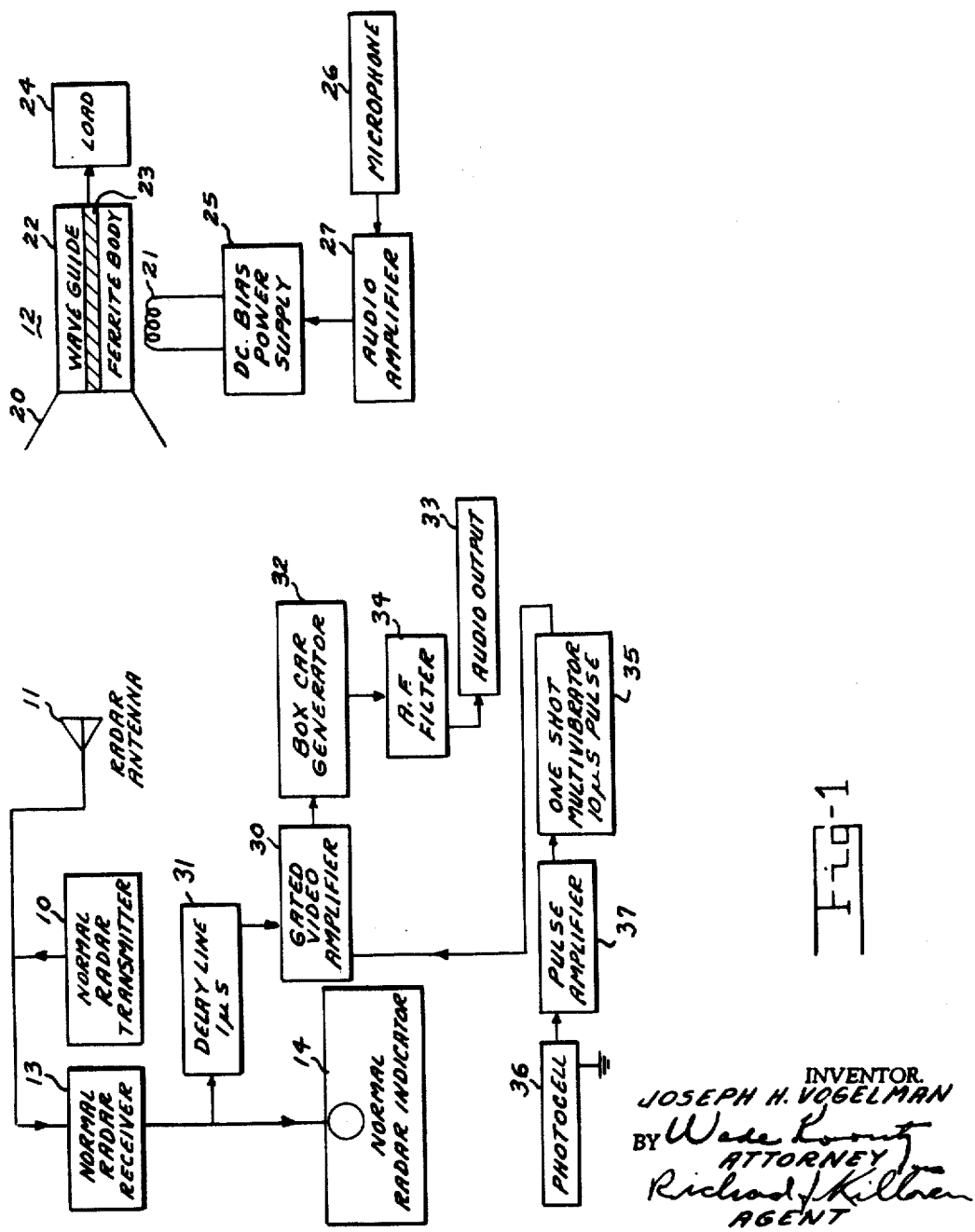
FIG. 1 shows a system of providing passive modulation of a radar return signal.

A directional antenna or resonant element will produce a target of considerable larger effective area than a sphere or random shaped element of the same cross sectional area. For example, an aircraft of the F-86 type, tail-on, has an echoing area of approximately .2 square meter, while an antenna of the horn type with the aperture of 1½" x 1½", and a gain of 16, will have an effective target echoing area of approximately .02 square meter with a wave length of 3 centimeters.

Accordingly, the addition of a horn antenna of this type would furnish over 90° sector a 10% increase in the effective area of the target.

It is possible to produce modulation of the radar echo and to transmit information from the target site to the radar site by varying the effective target area. One means for producing this modulation is to use an antenna followed by a ferrite waveguide which is terminated in a dummy load. A magnetic field is applied to the ferrite through an electromagnetic winding around the waveguide section. The DC voltage applied to the electromagnetic winding is adjusted so that the reflection from the ferrite is a minimum and the effective radar target cross section is a minimum. The application of either voice or pulse coded data to the electromagnetic winding will vary the effective radar target cross section area from minimum and the radar return therefore is modulated in accordance with the voice or pulse coded data. Both voice and pulse modulation have been found suitable for data transmission.

Referring more particularly to FIG. 1 of the drawing. Reference numeral 10 refers to a normal radar transmitter. The signal from the transmitter is applied to antenna 11 which also received the return signal from target 12. The return signal from the target is applied to the receiver 13 which in turn produces an indication on the radar indicator 14 in the normal manner. The device 12 may be mounted on a target such as an aircraft. The effective cross section of the target presented by the horn 20 is controlled by the voltage applied to the coil 21, shown schematically, which is wound around the waveguide 22.

The waveguide 22 has a ferrite load 23 located therein, which is terminated with a dummy load 24. With a steady DC current applied to the coil 21 by the power supply 25 the maximum amount of energy is coupled to load 24. A voice signal from microphone 26 is amplified in amplifier 27 and added to the DC voltage from power supply 25 to modulate the current flowing in coil 21. The change in current flowing in 21 will change the coaxial magnet field in the waveguide ferrite body 23, and thus change the reflection coefficient of the target in accordance with the voice signal. Disclosure of a ferrite loaded waveguide can be found in the proceedings of the Symposium on Modern Advances in Microwave Techniques, Polytechnic Institute of Brooklyn, 1954, pages 175 through 251, particularly pages 207 and 208.

To remove the voice information at the radar site, the output of radar receiver 13, besides being applied to the radar indicator 14, is also applied to a gated video amplifier 30 through a one microsecond delay line 31. The output of amplifier 30 is demodulated in box car generator 32 and applied to an audio output circuit 33 through audio frequency filter circuit 34. To allow only the audio signal from the desired target to reach the audio output circuit, a 10 microsecond pulse from a one shot multivibrator 35 is applied to the gated video amplifier 30. The time of the multivibrator pulse is controlled by a signal from a photocell 36, which is placed over the desired target of radar indicator 14.

To provide for 2-way transmission of information and use of the circuit for the transmission of 2-way pulse coded information, the circuit of FIG. 2 can be used. Like elements in the two figures are given the same reference numerals. When the system is to be used for a 2-way transmission of voice information, the transmitted signal is modulated by signal from modulator 40. The device at the target site is then modified by connecting the load circuit 24 to a crystal rectifier mixer 41. The output of the crystal rectifier is amplified in amplifier 42 and 43 and applied to a box car generator 44. The output of box car generator 44 is fed to the output circuit 45 through an audio frequency filter 46. When pulse coded information is used a signal for varying the amplitude or position of the radar pulse is applied to radar modulator 40 from interrogator coder 50. The coded response from the target site is produced by applying the output of video amplifier 43 to a decoder response modulator circuit 51. The output of the decoder response modulator circuit 51 is applied to the coil 21 through an amplifier 52 to modify the return signal in the same manner as is used for voice modulation. The information is removed from the signal at the radar site by applying the output of the voltage amplifier 30 to a pulse decoder circuit 53. Switches 55, 56 and 57 are provided to switch the circuits at the radar site and at the target site between voice and pulse code operation.

In normal operation the radar transmitter 10 transmits a pulse through radar antenna 11. This signal is received in antenna 20 mounted in an Air Force vehicle or other location needing to be identified. With the DC bias from the DC power supply 25 flowing in magnetic field coil 21, the maximum amount of signal is coupled through dummy load 24 to crystal rectifier mixer 41. After heterodyning against the local oscillator by amplification in IF amplifier 42 and video amplifier 43, the signal is fed to box car generator 44 or decoder response modulator 51 dependent on the mode of operation. In the IFF mode the signal would be fed to decoder response modulator 51. This output would be fed to audio amplifier 52 and add its pulses to the DC bias power supply 25 modulating the current flow in the magnetic field coil 21. The change in current flow in the magnetic field coil will change the coaxial magnetic field in the waveguide ferrite body 23 to present an appropriate reflection coefficient at the terminals of antenna 20. The presence of a decoder response pulse would produce a larger reflection than its absence. The reflected signal would be picked up by radar antenna 11 and passed into radar receiver 13;

one of whose outputs would go to the normal radar indicator 14. The other output would go through a delay line 31 of approximately one microsecond and to a gated video amplifier 30 normally biased below cutoff so that no signals would leave the gated video amplifier. To examine the response of the vehicle being interrogated, the operator would place photocell 36 over the target on the radar indicator. The arrival of the target signal in the radar indicator would produce a bright spot on the indicator. This would be picked up by the photocell as a pulse, fed through the pulse amplifier 37, to a one shot multivibrator 35 producing a ten microsecond pulse. This negative pulse output, when applied to the gated video amplifier would permit the amplifier to amplify during the ten microsecond duration of the pulse. The amplifier output could be fed either to the box car generator 32 or pulse decoder 53 or both simultaneously. In the normal IFF mode, it would be fed to pulse decoder 53. Its output would be the pulse code transmitted from the decoder response modulator 51, if that response had been in accordance with the code of that time. To prevent the decoder response modulator from replying to every radar interrogation, it can be adjusted to recognize a coded pulse chain as an interrogation. The decoder response modulator 51 would then recognize this code and reply only when it receives the proper code.

This system can also be used for communicating from the radar to the vehicle and back to the radar. Illustrated on the drawing is an audio possibility which with minor changes could be used for transmission of data instead. In this case the interrogator coder 50 would be activated from an appropriate source of voice or data and the amplitude or position of the radar pulses would be modified accordingly. The signal received in video amplifier 43 would be applied to box car generator 44 whose output would be filtered by audio filter 46 to produce an audio output 45 in the form of either data or voice. The reply would be initiated at microphone 26 and fed to audio amplifier 27 then to audio amplifier 52 and modulate the current flowing in magnetic field coil 21, changing the reflection coefficient of antenna 20 in synchronism with the message information fed in at microphone 26. This output would be received through the gated video amplifier 30 provided that photocell 36 were positioned on the target with which communications was desired. This output would be fed to box car generator 32, audio filter 34 and output 33.

There is thus provided a system providing passive modulation of a radar return signal at the target site.

While certain specific embodiments have been described in detail it is obvious that numerous changes may be made without departing from the general principles and scope of the invention.

I claim:

1. An information transmission system comprising: an antenna element, means for producing a radar signal, means for directing said signal toward said antenna element, a waveguide connected to said antenna element, a ferrite body within said waveguide, a crystal rectifier mixer circuit connected to the output of said waveguide, a decoder response modulator circuit connected to the output of said crystal rectifier mixer circuit, means responsive to the output of said decoder response modulator circuit for modifying the coaxial magnetic field in said waveguide ferrite body to thereby change the effective target area of said antenna, means for receiving the return signal from said antenna element, a radar indicator, means for applying the output of said receiving means to said radar indicator, a decoder circuit, means for applying the output of said receiving means to said decoder circuit, a gate circuit and a delay means connected between said receiving means and said decoder circuit, means responsive to the image on said radar indicator for operating said gate circuit only during the time that the radar return signal is visible on said radar indicator.

2. An information transmission system, comprising: an antenna element, a waveguide connected to said antenna element, a ferrite load within said waveguide, a coil wound around said waveguide, a crystal rectifier mixer circuit, means for applying the output of said waveguide to said crystal rectifier mixer circuit, a decoder response modulator circuit, means for connecting the output of said crystal rectifier mixer circuit to said decoder response modulator circuit, means for connecting the output of said decoder response modulator to said coil to thereby modify the effective target area of said antenna element in accordance with the signal from said decoder response modulator, means for producing a radar signal, means for directing said signal toward said antenna element, means for receiving the return signal from said antenna element, a radar indicator, means for applying the output of said receiving means to said radar indicator, a pulse decoder circuit, means for applying the output of said receiving means to said pulse decoder circuit, a gate circuit and a delay means connected between said receiving means and said demodulator circuit, means responsive to the image on said radar indicator for operating said gate circuit only during the time that the radar return signal is visible on said radar indicator.

3. An information transmission system, comprising: an antenna element, a waveguide connected to said antenna element, a ferrite load within said waveguide, a coil wound around said waveguide, a crystal rectifier mixer circuit, means for applying the output of said waveguide to said crystal rectifier mixer circuit, a demodulator circuit, means for connecting the output of said crystal rectifier mixer circuit to said demodulator circuit, an audio output circuit connected to the output of said demodulator circuit, means for producing an intelligence signal, means for connecting said intelligence signal to said coil to thereby modify the effective target area of said antenna element, means for producing a radar signal, means for directing said signal toward said antenna element, means for receiving the return signal from said antenna element, a radar indicator, means for applying the output of said receiving means to said radar indicator, a demodulator circuit means for applying the output of said receiving means to said demodulator circuit, a gate circuit and a delay means connected between said receiving means to said demodulator circuit, means responsive to the image on said radar indicator for operating said gate circuit only during the time that the radar return signal is visible on said radar indicator and an output circuit connected to said demodulator circuit.

4. An information transmission system, comprising: an antenna element, a waveguide connected to said antenna element, a ferrite load within said waveguide, a coil wound around said waveguide, a crystal rectifier mixer circuit, means for applying the output of said waveguide to said crystal rectifier mixer circuit, a demodulator circuit, a decoder response modulator circuit, means for selectively connecting the output of said crystal rectifier mixer circuit to said demodulator circuit and said decoder response modulator circuit, an audio output circuit connected to the output of said demodulator circuit, means for producing an intelligence signal, means for selectively connecting said intelligence signal and the output of said decoder response modulator to said coil to thereby modify the effective target area of said antenna element, means for producing a radar signal, means for directing said signal toward said antenna element, means for receiving the return signal from said antenna element, a radar indicator, means for applying the output of said receiving means to said radar indicator, a demodulator circuit, a pulse decoder circuit means for selectively applying the output of said receiving means to said demodulator circuit, and to said pulse decoder circuit, a gate circuit and a delay means connected between said receiving means and said demodulator circuit, means responsive to the image on said radar indicator for operating said gate circuit only during the time that the radar return signal is visible on said radar indicator and an output circuit connected to said demodulator circuit.

References Cited

UNITED STATES PATENTS

| | | | |
|---|---|---|---|
| 2,403,729 | 7/1946 | Loughren | 343—10 |
| 2,453,970 | 11/1948 | Charrier | 343—6.5 |
| 2,461,005 | 2/1949 | Southworth | 343—6.5 |
| 2,461,646 | 2/1949 | Lewis | 343—18 |
| 2,520,008 | 8/1950 | King | 343—18 |
| 2,543,130 | 2/1951 | Robertson | 343—18 |
| 2,745,069 | 5/1956 | Hewitt | 332—51 |
| 2,885,665 | 5/1959 | Wolff | 343—6.5 |
| 2,595,141 | 4/1952 | Herbst | 343—6.5 |
| 2,903,690 | 9/1959 | Slack | 343—5 |

RICHARD A. FARLEY, *Primary Examiner.*

FREDERICK M. STRADER, CHESTER L. JUSTUS,
*Examiners.*

M. A. MORRISON, M. F. HUBLER,
*Assistant Examiners.*